United States Patent
Jeong et al.

(10) Patent No.: US 11,087,768 B2
(45) Date of Patent: Aug. 10, 2021

(54) PERSONALIZED VOICE RECOGNITION SERVICE PROVIDING METHOD USING ARTIFICIAL INTELLIGENCE AUTOMATIC SPEAKER IDENTIFICATION METHOD, AND SERVICE PROVIDING SERVER USED THEREIN

(71) Applicant: POWERVOICE CO., LTD., Bucheon-si (KR)

(72) Inventors: Hee-suk Jeong, Gimpo-si (KR); Hyung Yup Lee, Yongin-si (KR); Se Hun Chin, Seoul (KR); Hyung Taek Lim, Seoul (KR)

(73) Assignee: POWERVOICE CO., LTD., Bucheon-si (KR)

( * ) Notice: Subject to any disclaimer, the term of this patent is extended or adjusted under 35 U.S.C. 154(b) by 117 days.

(21) Appl. No.: 16/477,330

(22) PCT Filed: Apr. 7, 2017

(86) PCT No.: PCT/KR2017/003807
§ 371 (c)(1),
(2) Date: Jul. 11, 2019

(87) PCT Pub. No.: WO2018/131752
PCT Pub. Date: Jul. 19, 2018

(65) Prior Publication Data
US 2019/0378518 A1  Dec. 12, 2019

(30) Foreign Application Priority Data

Jan. 11, 2017  (KR) .................... 10-2017-0004094

(51) Int. Cl.
*G10L 17/18* (2013.01)
*G10L 15/22* (2006.01)
*G10L 17/00* (2013.01)

(52) U.S. Cl.
CPC .............. *G10L 17/18* (2013.01); *G10L 15/22* (2013.01); *G10L 17/00* (2013.01); *G10L 2015/223* (2013.01); *G10L 2015/225* (2013.01)

(58) Field of Classification Search
USPC ...................................... 704/1–504
See application file for complete search history.

(56) References Cited

U.S. PATENT DOCUMENTS 9,832,619 B2 * 11/2017 Cho .................. H04M 1/72436
9,967,744 B2 *  5/2018 Kim .................... H04W 12/068
(Continued)

FOREIGN PATENT DOCUMENTS

JP        2005086768 A  *  3/2005
KR  10-2005-0023941 A       3/2005
(Continued)

*Primary Examiner* — Marcus T Riley
(74) *Attorney, Agent, or Firm* — Novick, Kim & Lee, PLLC; Jae Youn Kim; Jihun Kim

(57) ABSTRACT

The present disclosure provides a method for providing a personalized voice recognition service using an artificial intelligence automatic speaker identification method and a service providing server used therein. The present disclosure is implemented through processes of, by a service providing server, receiving a service provision request message including a voice of a speaker from a user terminal, analyzing the voice included in the service provision request message to identify the speaker of the voice, generating a control command needed to provide a customized service for the speaker based on speaker identification information, and transmitting the generated control command to an external electronic device. According to the present disclosure, since the speaker using the voice recognition service can be identified, it is possible to prevent a person who does not have a legal use authority from using a voice recognition service without permission, and provide a customized voice recognition service considering unique information for each (Continued)

individual user when there are a plurality of users using the same voice recognition service.

4 Claims, 2 Drawing Sheets

(56) References Cited

U.S. PATENT DOCUMENTS

| | | | |
|---|---|---|---|
| 2014/0297672 A1* | 10/2014 | Song | G06F 16/9535 707/756 |
| 2015/0019221 A1* | 1/2015 | Lee | G10L 15/08 704/246 |
| 2015/0025888 A1* | 1/2015 | Sharp | G10L 17/04 704/246 |
| 2015/0149175 A1* | 5/2015 | Hirata | G10L 15/22 704/246 |
| 2016/0037311 A1* | 2/2016 | Cho | H04W 4/12 455/466 |
| 2016/0174074 A1* | 6/2016 | Kim | H04M 3/42204 455/411 |
| 2019/0378518 A1* | 12/2019 | Jeong | G10L 17/18 |

FOREIGN PATENT DOCUMENTS

| | | |
|---|---|---|
| KR | 10-2008-0023033 A | 3/2008 |
| KR | 10-2012-0066523 A | 6/2012 |
| KR | 10-2016-0027728 A | 3/2016 |

\* cited by examiner

PERSONALIZED VOICE RECOGNITION SERVICE PROVIDING METHOD USING ARTIFICIAL INTELLIGENCE AUTOMATIC SPEAKER IDENTIFICATION METHOD, AND SERVICE PROVIDING SERVER USED THEREIN

TECHNICAL FIELD

The present invention relates to a personalized voice recognition service providing method and a service providing server used therein, and more particularly, to a method for providing a personalized voice recognition service using an artificial intelligence automatic speaker identification method, in which since a speaker using the voice recognition service can be identified, it is possible to prevent a person who does not have a legal use authority from using a voice recognition service without permission, and provide a customized voice recognition service considering unique information for each individual user when there are a plurality of users using the same voice recognition service, and a service providing server used therein.

BACKGROUND ART

In recent years, as voice recognition techniques have been rapidly developed, various voice recognition services such as Apple's Ski, Google's Now, Microsoft's Cortana, Amazon's Alexa, and the like have been introduced.

However, the conventional voice recognition service in the art responds to a voice command of a speaker, thereby merely providing a service related thereto, but does not identify identities of the speaker in a process of providing the voice recognition service.

As a result, even if a user does not have a legal use authority to use the voice recognition service, the user may use the voice recognition service without permission. In addition, when there are a plurality of users using the same voice recognition service, there is a technical limitation that a customized voice recognition service for each individual user cannot be provided to the users.

SUMMARY OF INVENTION

Problems to be Solved by Invention

Accordingly, it is an object of the present invention to provide a method for providing a personalized voice recognition service using an artificial intelligence automatic speaker identification method, in which since a speaker using the voice recognition service can be identified, it is possible to prevent a person who does not have a legal use authority from using a voice recognition service without permission, and provide a customized voice recognition service considering unique information for each individual user when there are a plurality of users using the same voice recognition service, and a service providing server used therein.

Means for Solving Problems

To achieve the above object, according to an aspect of the present invention, there is provided a method for providing a personalized voice recognition service, including: (a) receiving, by a service providing server, a service provision request message including a voice of a speaker from a user terminal; (b) analyzing, by the service providing server, the voice included in the service provision request message to identify the speaker of the voice; (c) generating, by the service providing server, a control command needed to provide a customized service for the speaker based on speaker identification information; and (d) transmitting, by the service providing server, the generated control command to an external electronic device.

Preferably, the step (b) includes: (b1) performing, by the service providing server, text-dependent speaker identification on the voice; and (b2) performing, by the service providing server, text-independent speaker identification on the voice.

Meanwhile, according to another aspect of the present invention, there is provided a service providing server comprising: a reception unit configured to receive a service provision request message including a voice of a speaker from a user terminal; a speaker identification unit configured to analyze the voice included in the service provision request message to identify the speaker of the voice; a determination unit configured to generate a control command needed to provide a customized service for the speaker based on speaker identification information generated by the speaker identification unit; and a transmission unit configured to transmit the control command to an external electronic device.

Preferably, the speaker identification unit performs the text-dependent speaker identification on the voice and the text-independent speaker identification on the voice.

Advantageous Effects

According to the present invention, since a speaker using the voice recognition service can be identified, it is possible to prevent a person who does not have a legal use authority from using a voice recognition service without permission, and provide a customized voice recognition service considering unique information for each individual user when there are a plurality of users using the same voice recognition service, and a service providing server used therein.

MODE FOR CARRYING OUT INVENTION

Figure 1:
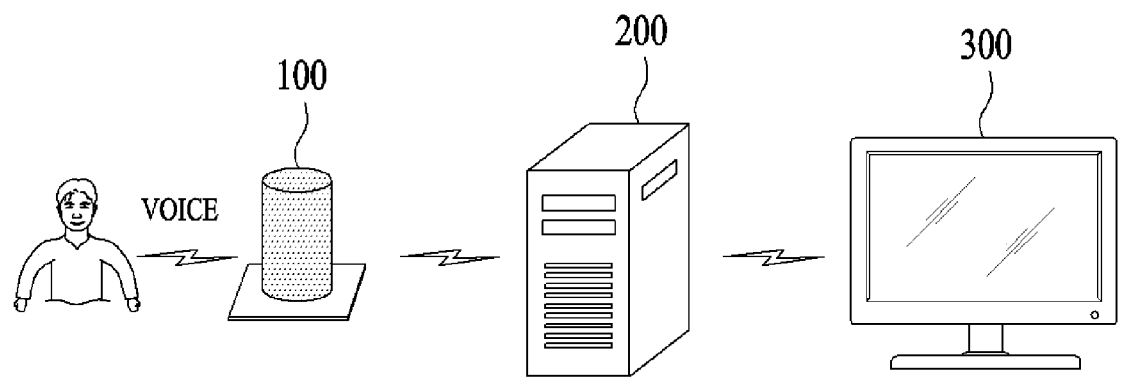
FIG. 1 is a schematic view illustrating a structure of a system for providing a personalized voice recognition service according to an embodiment of the present invention.

Hereinafter, the present invention will be described with reference to the accompanying drawings in detail. Referring to the drawings, wherein like reference characters designate like or corresponding parts throughout the several views. In the embodiments of the present invention, the publicly known functions and configurations that are judged to be able to make the purport of the present invention unnecessarily obscure will not be described.

FIG. 1 is a schematic view illustrating a structure of a system for providing a personalized voice recognition service according to an embodiment of the present invention.

Referring to FIG. 1, the system for providing a personalized voice recognition service based on speaker identification information according to the embodiment of the present invention includes a user terminal 100, a service providing server 200, and an external electronic device 300.

The user terminal 100 is a terminal installed in a space in which a user lives, such as a living room of a home, and includes a microphone module and a speaker module integrally formed therewith, as well as a communication module for performing a wireless communication with a wireless communication terminal such as a smartphone carried by the service providing server 200 or the user.

Specifically, the user terminal 100 performs the functions of: receiving a service request voice of a speaker through the microphone module; transmitting a service provision request message including the voice to the service providing server 200; and then outputting a customized service proposal message received from the service providing server 200 through the speaker module.

Meanwhile, when performing the present invention, the user terminal 100 may also perform a local area communication with the wireless communication terminal such as a smartphone. In this case, a service request voice input by the user through the wireless communication terminal is transmitted to the user terminal 100, and the user terminal 100 may transmit a service provision request message including the input voice to the service providing server 200.

In this case, the user terminal 100 may transmit the customized service proposal message received from the service providing server 200 to the wireless communication terminal, and the transmitted message is output to the user through the wireless communication terminal.

Meanwhile, when performing the present invention, the wireless communication terminal such as a smartphone carried by the user may also perform the function of the user terminal 100 in itself as described above.

The service providing server 200 is a server which is installed and operated by a provider who provides a personalized voice recognition service according to the present invention. The service providing server 200 performs the functions of: receiving a service provision request message including the voice of the speaker from the user terminal 100; analyzing the voice included in the service provision request message to identify the speaker of the voice; generating a control command needed to provide a customized service based on speaker identification information; and transmitting the generated control command to the external electronic device 300.

Meanwhile, the external electronic device 300 is a device operated according to the control command from the service providing server 200, and may be a smart TV installed in the home, or a device for the Internet of Things (IoT) such as a lighting device, heating device, and air conditioner, which are operated in conjunction with the service providing server 200.

Figure 2:
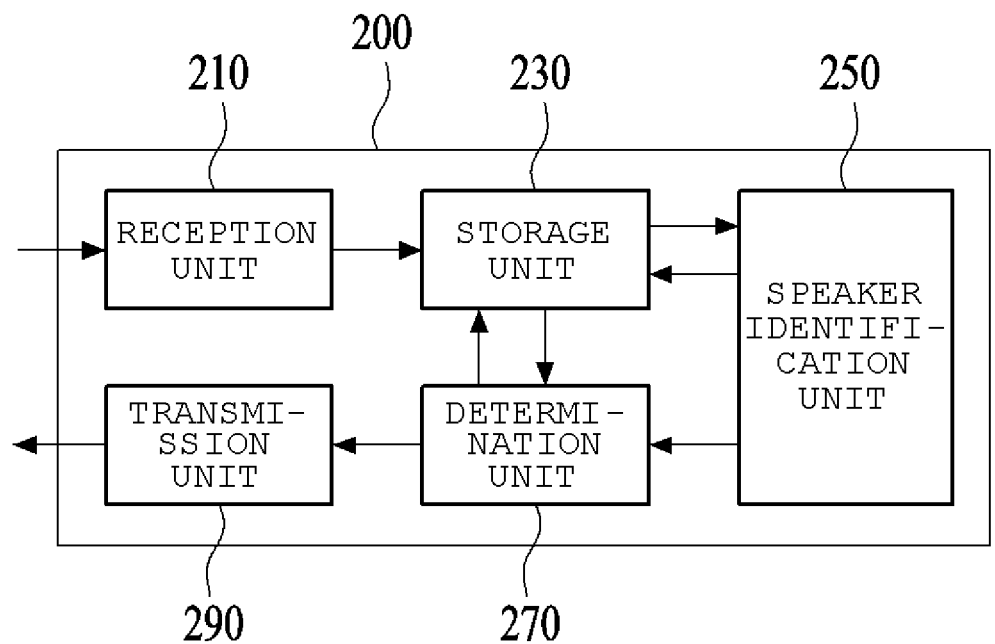
FIG. 2 is a functional block diagram illustrating a structure of a service providing server for providing a personalized voice recognition service according to the embodiment of the present invention.

FIG. 2 is a functional block diagram illustrating a structure of the service providing server 200 for providing the personalized voice recognition service according to the embodiment of the present invention. Referring to FIG. 2, the service providing server 200 for providing the personalized voice recognition service according to the embodiment of the present invention includes a reception unit 210, a storage unit 230, a speaker identification unit 250, a determination unit 270, and a transmission unit 290.

First, the reception unit 210 of the service providing server 200 receives the service provision request message including the voice of the speaker from the user terminal 100, and the received message is stored in the storage unit 230.

Meanwhile, in addition to the service provision request message received from the user terminal 100, the storage unit 230 of the service providing server 200 stores various media content files such as sound sources and moving pictures which are output through the external electronic device 300 such as the smart TV, and a file list, and individually stores voice registration information of a plurality of users using the user terminal 100, a personalized voice recognition service list provided to each user, and device registration information including IP addresses of a plurality of external electronic devices 300 that can be controlled by the service providing server 200.

In addition, the speaker identification unit 250 of the service providing server 200 extracts and analyzes the voice information included in the service provision request message received from the user terminal 100, thereby identifying the speaker of the voice.

Specifically, the speaker identification unit 250 performs a speaker identification according to a text-dependent analysis of the voice included in the service provision request message in parallel to a speaker identification according to a text-independent analysis of the voice, and ultimately identifies the speaker based on the two identification results independently performed as described above.

Meanwhile, the determination unit 270 of the service providing server 200 determines the external electronic device 300 to provide the service for the speaker based on the speaker identification information generated by the speaker identification unit 250 and the customized service to be provided through the external electronic device 300, and generates a control command of the external electronic device 300 needed to provide the service.

The transmission unit 290 of the service providing server 200 performs the functions of: transmitting the control command generated by the determination unit 270 to the external electronic device 300 selected by the determination unit 270; and transmitting the customized service proposal message generated by the determination unit 270 to the user terminal 100.

Figure 3:
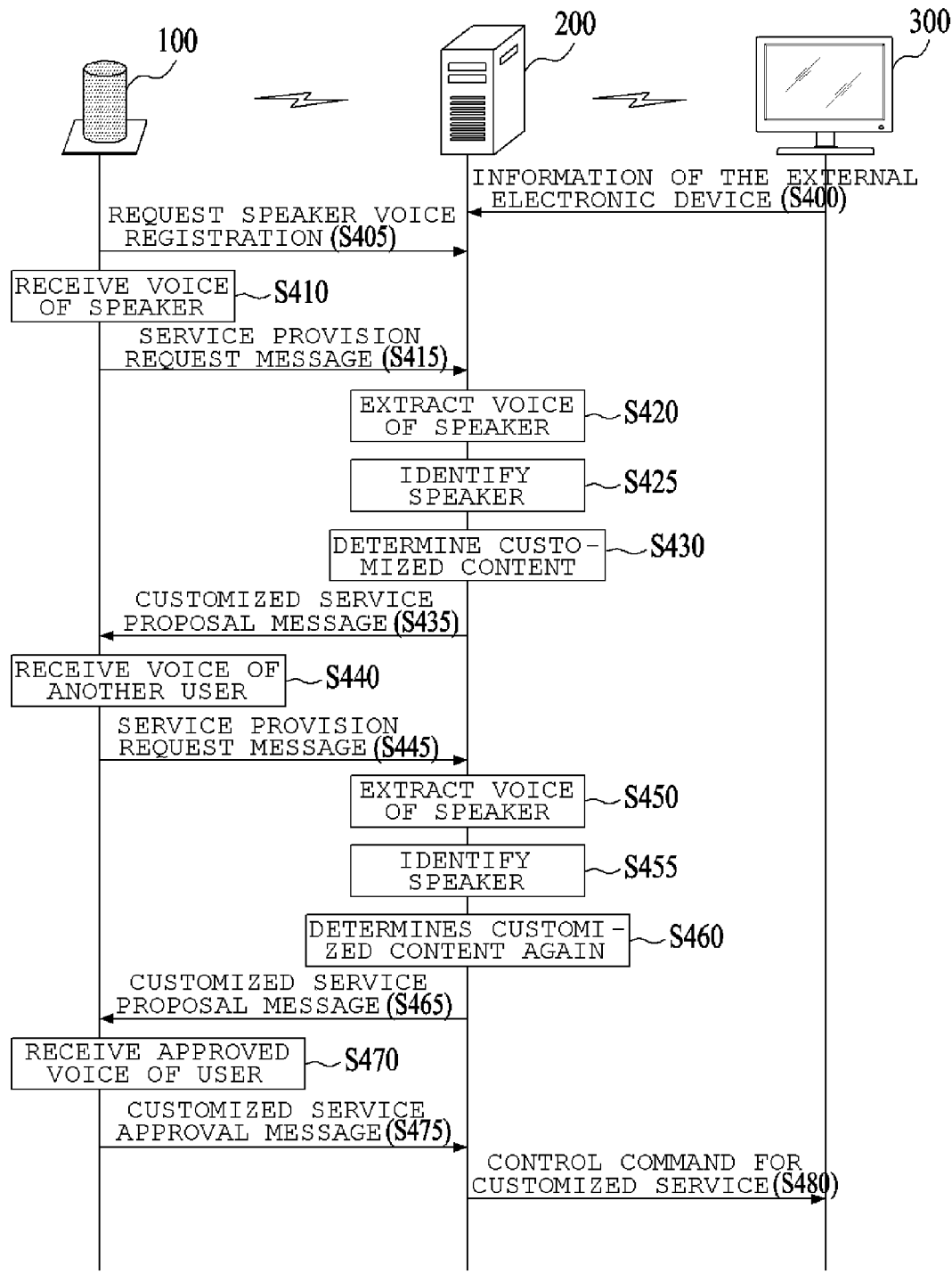
FIG. 3 is a flow chart illustrating signals in an execution process of a method for providing a personalized voice recognition service according to the embodiment of the present invention.

FIG. 3 is a flow chart illustrating signals in an execution process of a method for providing a personalized voice recognition service according to the embodiment of the present invention. Hereinafter, the method for providing a personalized service based on the speaker identification information according to the embodiment of the present invention will be described with reference to FIG. 1 to FIG. 3.

First, the service providing server 200 receives the registration information from the external electronic device 300, which is the smart TV, or the device for the Internet of Things (IoT) such as the lighting device, heating device, and air conditioner, which are operated in conjunction with the service providing server 200, and the received registration information of the external electronic device 300 is stored in the storage unit 230 of the service providing server 200 (S400).

Specifically, it is preferable that the registration information of the external electronic device 300 includes information on types of the device (the lighting device, video device, heating device, cooling device, etc.) of the external electronic device 300, and information on the IP address of the external electronic device 300.

Further, the service providing server 200 receives a voice registration request of a plurality of users using the user terminal 100 from the user terminal 100, and individual voice information of the plurality of users included in the voice registration request is mapped with user information including ID information assigned for each user to be stored in the storage unit 230 as shown in Table 1 below (S405).

Specifically, it is possible to provide the user information (user ID, gender, age, preferred content information) shown in Table 1 by receiving and storing information by the service providing server 200, which is input through a personal computer (PC) or a smartphone of each user in a subscription procedure for the personalized voice recognition service through the PC or smartphone.

TABLE 1

| USER ID | Gender | Age | Registered voice data | Preferred content information |
|---------|--------|-----|----------------------|-------------------------------|
| USER 1 | Woman | 35 years old | DATA 1 | American drama/Family movie/Newest song |
| USER 3 | Man | 39 years old | DATA 3 | Action movie/Learning English/Old pop music |
| USER 2 | Man | 14 years old | DATA 2 | Family movie/Action movie/Hip-hop music |

If a specific user USER 1 present in a space where the user terminal 100 is installed speaks 'Olleh!, I'm bored and is there anything fun?,' for example, the user terminal 100 receives the voice of the speaker (S410), generates a service provision request message including the received voice of the speaker, and transmits the generated message to the service providing server 200 (S415).

Thereby, the reception unit 210 of the service providing server 200 receives the service provision request message from the user terminal 100, and the speaker identification unit 250 of the service providing server 200 extracts the voice of the speaker from the received service provision request message (S420).

Thereafter, the speaker identification unit 250 of the service providing server 200 analyzes the voice of the speaker, extracts the speaker voice data having the same format as the registered voice data in Table 1, and identifies the speaker by comparing the extracted speaker voice data with the voice data already registered in the storage unit 230 (S425).

Specifically, when performing the above-described step S425, it is preferable that the speaker identification unit 250 of the service providing server 200 performs the text-dependent voice analysis on an 'Olleh' portion (a so-called call portion)' of 'Olleh!, I'm bored and is there anything fun?,' which is the voice of the extracted speaker, and independently performs the text-independent voice analysis and the speaker identification on a 'is there anything fun?' portion (a so-called request portion), then finally identifies the speaker based on the two identification results independently performed as described above.

Accordingly, when the speaker for the voice is identified as 'USER 1' in Table 1 by the speaker identification unit 250 of the service providing server 200, the determination unit 270 of the service providing server 200 determines 'American drama' as the customized content for 'USER 1' based on the user information in Table 1 and the result of the voice analysis on the 'is there anything fun?' (request portion) (S430).

Meanwhile, when performing the voice analysis and the voice recognition on the 'is there anything fun?' (request portion) by the determination unit 270 of the service providing server 200, it is possible to use conventional voice analysis and recognition techniques known in various voice recognition services in the art.

Specifically, when performing step S430, the determination unit 270 of the service providing server 200 determines 'American drama,' which is a content having a relatively high preference, as the customized content for 'USER 1,' with reference to the preferred content information of other female members belonging to the same age range as the 'USER 1' among 'American drama/family movie/newest song,' which are the preferred content information of 'USER 1.'

Accordingly, the determination unit 270 of the service providing server 200 generates a customized service proposal message such as 'Would you like to watch an American drama recommended by Olleh TV?,' and the transmission unit 290 of the service providing server 200 transmits the generated message to the user terminal 100 (S435).

Thereby, the user terminal 100 outputs the customized service proposal message from the service providing server 200 to the user through the speaker module.

Meanwhile, when performing the present invention, the customized service proposal message output through the user terminal 100 may be able to listen to not only the 'USER 1' but also the other users in the same space. For the recommended drama, the other users may say, "Olleh!, I don't like. Recommend another one."

In this case, the user terminal 100 receives a voice of another user as described above (S440), and transmits a service provision request message including the received voice to the service providing server 200 (S445).

Accordingly, the reception unit 210 of the service providing server 200 receives the service provision request message from the user terminal 100, and the speaker identification unit 250 of the service providing server 200 extracts the voice of the speaker from the service provision request message (S450).

Thereafter, the identification unit of the service providing server 200 analyzes the voice of the speaker, extracts speaker voice data having the same format as the registered voice data in Table 1, and identifies the speaker by comparing the extracted speaker voice data with the voice data already registered in the storage unit 230 (S455).

Accordingly, when the identification unit of the service providing server 200 identifies the speaker as 'USER 2' in Table 1, the determination unit 270 of the service providing server 200 determines the customized content again in consideration of 'USER 2' as well as 'USER 1' based on the user information in Table 1. As a result, it is possible to determine the 'family movie' as the customized content for 'USER 1' and 'USER 2' (S460).

Specifically, when performing step S460, the determination unit 270 of the service providing server 200 determines the 'family movie' which is content information commonly included in the 'American drama/family movie/newest song,' which is the preferred content information of 'USER 1,' and the 'family movie/action movie/hip-hop music,' which is the preferred content information of 'USER 2' as the customized content.

Accordingly, the determination unit 270 of the service providing server 200 generates a customized service proposal message such as 'Yes, would you like to watch a family movie recommended by the Olleh TV?,' and the transmission unit 290 of the service providing server 200 transmits the generated message to the user terminal 100 (S465).

Thereby, the user terminal 100 outputs the customized service proposal message from the service providing server 200 through the speaker module. When the user (USER 1 or USER 2) who listens to the output message says 'Okay, Olleh,' the service terminal 100 receives the approved voice of the user as described above (S470), and transmits a customized service approval message including the approved voice to the service providing server 200 (S475).

Accordingly, the determination unit 270 of the service providing server 200 generates a control command needed to reproduce the 'family movie' which is the customized content or recommend a family movie list, and selects the external electronic device 300 to receive the generated control command.

Specifically, the determination unit 270 of the service providing server 200 selects the smart TV as the electronic device 300 to perform the reproduction of the 'family movie' or the recommendation of the family movie list among the external electronic devices 300 registered in the storage unit 230, and the transmission unit 290 of the providing server 200 transmits the control command to the IP address of the smart TV registered in the storage unit 230.

As a result, the smart TV performs the reproduction of the 'family movie' or the recommendation of a reproduction list, i.e., the family movie list, based on the control command received from the service providing server 200.

The terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

While the present invention has been described with reference to the preferred embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

INDUSTRIAL APPLICABILITY

The present invention can be applied to the personalized voice recognition service, such that industrial applicability thereof may be recognized in the voice recognition service industrial fields.

The invention claimed is:

1. A method for providing a personalized voice recognition service, the method comprising:
receiving, by a service providing server, a voice registration request of each of a plurality of users from a user terminal;
performing, by the service providing server, a mapping of voice information of each of the plurality of users included in the voice registration request with user information including identification information and preferred content information, and storing the mapped information in the service providing server;
receiving, by the service providing server, a service provision request message including a voice of a speaker from the user terminal;
analyzing, by the service providing server, the voice included in the service provision request message to identify the speaker of the voice, which is to be corresponded to one of the plurality of users;
determining, by the service providing server, at least a part of the preferred content information of an identified user as a customized content for the speaker;
generating, by the service providing server, a customized service proposal message based on the customized content and a result of the voice analysis;
transmitting, by the service providing server, the generated customized service proposal message to the user terminal to output the customized service proposal message to the speaker;
receiving, by the service providing server, a customized service approval message from the user terminal;
generating, by the service providing server, a control command needed to provide a customized service for the speaker; and
transmitting, by the service providing server, the generated control command to an external electronic device to provide the customized service.

2. A service providing server comprising one or more processors configured to:
receive a voice registration request of each of a plurality of users from a user terminal;
perform a mapping of voice information of each of the plurality of users included in the voice registration request with user information including identification information and preferred content information, and storing the mapped voice information in the service providing server;
receive a service provision request message including a voice of a speaker from the user terminal;
analyze the voice included in the service provision request message to identify the speaker of the voice, which is to be corresponded to one of the plurality of users;
determine at least a part of the preferred content information of an identified user as a customized content for the speaker;
generate a customized service proposal message based on the customized content and a result of the voice analysis;
transmit the generated customized service proposal message to the user terminal to output the customized service proposal message to the speaker;
receive a customized service approval message from the user terminal;
generate a control command needed to provide a customized service for the speaker based on speaker; and
transmit the control command to an external electronic device to provide the customized service.

3. The method of claim 1, wherein the analyzing the voice includes analyzing a call portion in a message presented by the voice and analyzing a request portion in the message presented by the voice, wherein steps of analyzing the call portion and analyzing the request portion are independently performed.

4. The service providing server of claim 2, wherein the one or more processors are configured to analyze a call portion in a message presented by the voice and analyze a request portion in the message presented by the voice, and wherein the one or more processors analyze the call portion and the request portion independently.

* * * * *